March 8, 1966  J. L. McCORD  3,238,800
REMOTELY CONTROLLED REAR VIEW MIRROR
Filed April 30, 1963  2 Sheets-Sheet 1

INVENTOR
Jesse L. McCord

March 8, 1966 J. L. McCORD 3,238,800
REMOTELY CONTROLLED REAR VIEW MIRROR
Filed April 30, 1963 2 Sheets-Sheet 2

INVENTOR
Jesse L. McCord

United States Patent Office 3,238,800
Patented Mar. 8, 1966

3,238,800
REMOTELY CONTROLLED REAR VIEW MIRROR
Jesse L. McCord, Covington, Ga.
Filed Apr. 30, 1963, Ser. No. 277,047
1 Claim. (Cl. 74—98)

This invention relates to remote control devices, and is more particularly concerned with a remote control device to vary the angular disposition of a rear view mirror.

In the past there have been provided various means to manipulate a rear view mirror, these taking the form of a mirror mounted on a ball joint with cables or the like to change the position of the mirror. None of the prior art devices, however, has solved the peculiar problem encountered with the right hand mirror of a truck.

In driving a truck, especially a semi-trailer truck, the right hand mirror (i.e., the mirror on the side opposite the driver) is depended on to a very large extent. When the driver turns a corner to the right, the side adjacent the curb is completely blind except for the mirror; also, in curves on the highway the side is blind but for the mirror. The conventional, fixed mirrors for the right side of a truck are usually positioned so that the driver can see along a line approximately parallel to the body of the truck, which is the best position as long as the tractor and the trailer are in a straight line; however, when the tractor is at an angle to the trailer as in a right turn, the driver can see only the side of the trailer, making the right side blind for practical purposes.

The device of the present invention overcomes the above discussed difficulties by providing a right hand mirror having automatic means to urge the mirror to a "normal" position in which the driver can see along a line approximately parallel to the truck; and, other manual means are provided by which the driver, while in his usual driving position, can rotate the mirror about its vertical axis so that he can see along a line parallel to the trailer when the tractor and trailer are not aligned. Though the mirror is usually urged toward its normal position, there is a provision for the mirror to be locked in any of a plurality of positions when desired.

It is therefore an object of the present invention to provide a rear view mirror which can be moved to another position and will automatically return to a preselected position.

It is another object of the present invention to provide a rear view mirror that can be controlled from a place remote from the mirror.

Another object of the present invention is to provide a rear view mirror which can be remotely locked in a position other than its normal point.

A further object of the present invention is to provide a remote control means for a rear view mirror which is simple and efficient in operation, durable in structure and well designed to be manufactured economically.

Other and further objects, features, and advantages of the present invention will become apparent from consideration of the following specification when taken in conjunction with the accompanying drawings in which.

Figure 1:
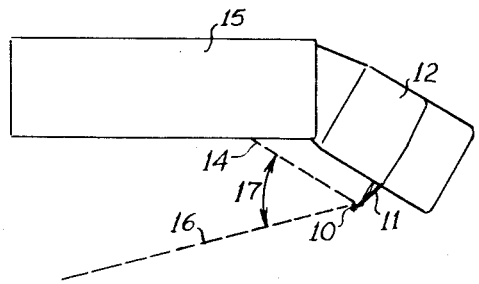
FIG. 1 is a schematic showing of the field of vision, relative to a semi-trailer truck, with the device of the present invention.

Referring now more particularly to the drawings in FIG. 1 the mirror 10 is mounted on the conventional bracket 11, the bracket 11 being secured to the tractor 12. The line of sight of the driver when the mirror 10 is in its normal position is shown by the broken line 14; and, when the tractor 12 and trailer 15 are not aligned, the line 14 intersects the trailer 15. The line 16 shows an adjusted position of the mirror 10, from which it will be clearly seen that the driver can see beyond the trailer 15. The area in the angle 17 is the field of vision possible with the mirror of the present invention. It will thus be readily seen that the driver has full visual command of the entire right side of the vehicle.

Figure 2:
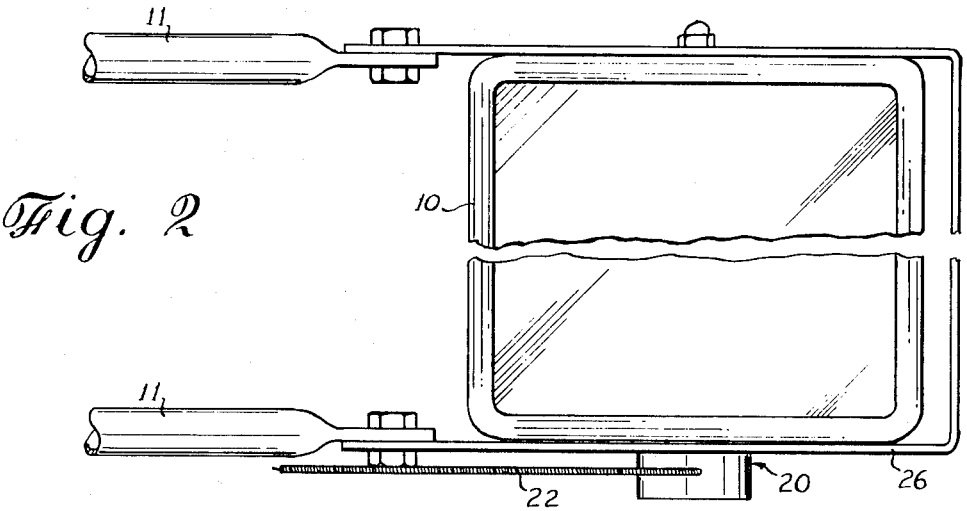
FIG. 2 is a front elevational view, partially broken away, of a mirror having the device of the present invention mounted thereon.

The particular device here chosen by way of illustration comprises a servo unit 20 and a control unit 21 connected by a cable or bowden wire 22. The servo unit will be described first, and is shown in FIGS. 2–4 of the drawings.

The mirror 10 is mounted for rotation in a U-shaped frame 26. The arms of the frame are attached, as by bolts, to the usual bracket 11. The servo unit 20 is attached to the bottom of the frame 26 as shown in FIG. 2; and, the bowden wire 22 leads from the servo unit 20 to the control unit 21 to be discussed hereinafter.

Figure 3:
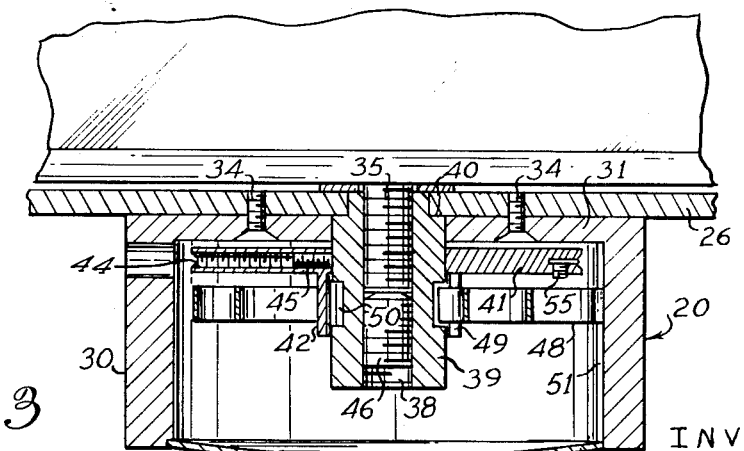
FIG. 3 is an enlarged cross-sectional view of the servo unit of the present invention.
Figure 4:
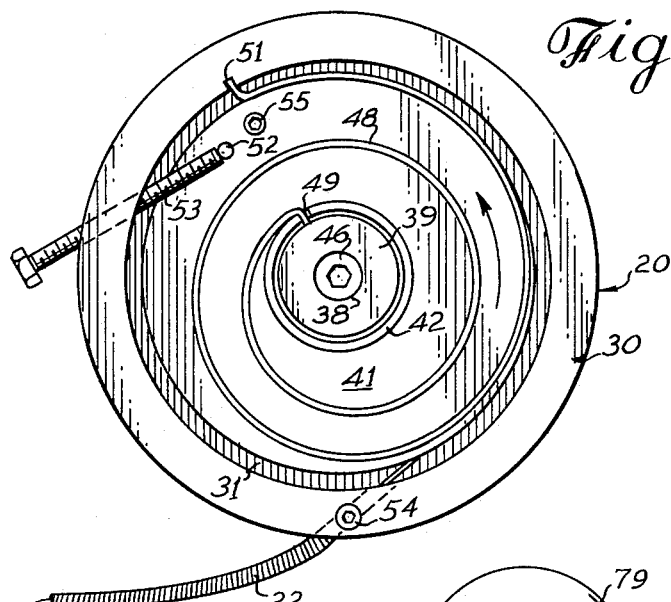
FIG. 4 is a bottom plan view of the servo unit with the cover plate removed.

Referring to FIGS. 3 and 4 of the drawings, the servo unit 20 includes a cylindrical housing 30 closed on one end by a wall 31 and on the opposite end by a cap plate 32. The housing 30 is fastened to the frame 26 by screws 34 passing through the wall 31 and threadedly engaging the frame 26.

Axially of the housing 30 is a spindle 39 which is received by a central opening in the wall 31 of the housing 30. The upper end of the spindle 39 is of reduced diameter providing a shoulder 40 to abut the frame 26 and limit the upward movement of the spindle 39 with respect to the housing 30. The spindle 39 has an axial threaded bore 38 to receive the stud 35 on the mirror 10 as will be discussed in more detail later.

The spindle 39 receives therearound a pulley 41. The lower side of the pulley 41 has an annular sleeve 42 which loosely surrounds the spindle 39. A hole 44 on a radius of the pulley 41 is threaded to receive a set screw 45 which locks the pulley 41 to the spindle 39.

Thus far it will be understood that the spindle 39 will turn in the opening in the wall 31 of the housing 30. The stud 35 on the mirror 10 is threaded into the axial bore 38 of the spindle 39, and is locked in place by a set screw 46 which is jammed against the stud 35. The pulley 41 is locked to the spindle 39, and the sleeve 42 is formed integrally with the pulley 41; therefore, the mirror 10, spindle 39, pulley 41, and sleeve 42 are fixed together to rotate together.

To urge the pulley, hence the mirror, in one direction, there is a spiral torsion spring 48 in the housing 30. One end of the spring 48 is held in a slot 49 in the sleeve 42. The spindle 39 is cut out providing a circumferential slot 50 to give clearance for the end of the spring. The outer end of the spring 48 is held in a key way or slot 51 in the inner circumference of the housing 30. The spring 48 is so biased as to urge the pulley 41 in the direction shown by the arrow in FIG. 4.

Movement of the pulley 41 by the spring 48 is limited by adjustable stop means: pin 52 on the pulley 41 contacts a bolt 53. The bolt 53 is threadedly engaged with the housing 30; therefore, the bolt can be adjusted to vary the point at which the pin 52 will strike the bolt; hence, the "normal" position of the pulley 41 and the mirror 10 can be adjusted.

To rotate the pulley 41 in the opposite direction, against the spring tension, a bowden wire 22 is provided. The sheath of the bowden wire 22 is threaded into the housing 30 and held in place by a set screw 54. The cable passes through the housing 30 and wraps around the pulley 41 about 180°, then turns inwardly to be held in place by a set screw 55.

It is thus seen that the servo unit is spring urged toward a pre-set position; and, it can be moved in the opposite direction by manipulation of the bowden wire 22.

The purpose of the control unit is to manipulate the bowden wire 22 as desired. It is contemplated that the control unit 21 will be mounted close to the drive of the vehicle, e.g., on the instrument panel, on the steering column etc.

The control unit 21 comprises a housing 60 having a substantially rectangular portion 61 enclosing a rack gear 62; and, intersecting the portion 61 is a cylindrical portion 64 enclosing a pinion gear 65 which meshes with the rack gear 62. The bowden wire 22 is received by the end wall of the housing portion 61, the sheath of the bowden wire being threaded into an appropriate opening and held by a set screw 66. The cable of the bowden wire 22 passes through the end wall and is received by a hole in the rack gear 62, and held by a set screw 68.

It will thus be seen that, as the rack 62 moves back and forth relative to the housing 60, the cable in the bowden wire 22 will move relative to its sheath, thus moving the servo unit as described above.

Figure 7:
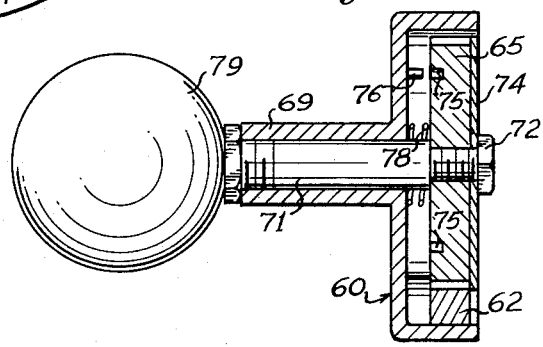
FIG. 7 is a cross-sectional view taken along the line 7—7 in FIG. 6.
Figure 5:
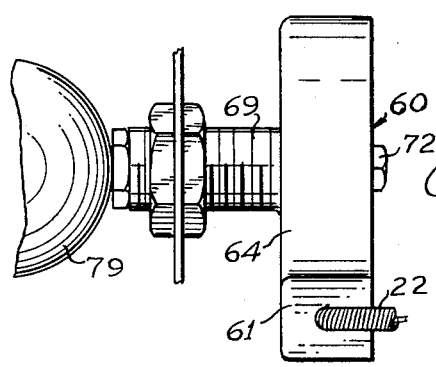
FIG. 5 is a side elevational view of the control unit or the present invention.

There is an externally threaded nipple 69 formed integrally with the housing 60, lying along the centerline of the cylindrical portion 64 of housing 60. The nipple 69 has a central bore 70 which journals a shaft 71; and, the shaft 71 mounts the pinion gear 65. The end of the shaft 71 is of reduced diameter, as best seen in FIG. 7, to provide an abutment shoulder to limit the movement of pinion 65. A nut 72 holds the pinion in a fixed position on the shaft 71.

Figure 6:
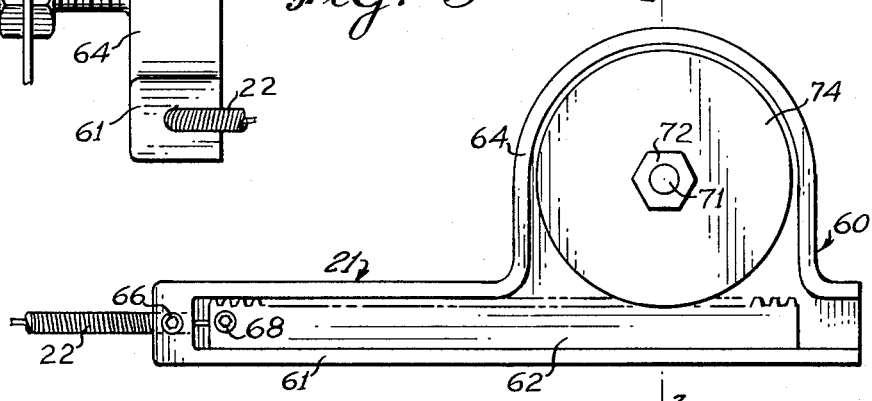
FIG. 6 is a rear elevational view of the control unit.

As shown in FIGS. 6 and 7, there is a flat, circular plate 74 against the face of the pinion 65. The plate 74 overlaps at least the teeth of the rack 62 so the rack can never slip out of engagement with the pinion 65.

The inner face of the pinion 65 has a plurality of holes 75, all being the same distance from the center of the gear. These holes 75 cooperate with the pin 76, which is fixed to the housing 60, to allow the device to be locked in one position.

A spring 78 surrounding the shaft 71 normally urges the pinion 65 outwardly so that the pinion clears the pin 76. If, however, the pinion 65 be rotated to align the pin 76 with one of the holes 75, and the pinion is pulled in by knob 79, the pin will enter the hole; and, the spring tension from the servo unit 20 will act through the bowden wire 22, urging the rack 62 to rotate the pinion 65. The frictional force thus created is sufficient to overcome the force of the spring 78 so that the pinion 65 will remain engaged with the pin 76.

It will thus be seen that the device of the present invention provides a very simple and efficient means for adjusting a rear view mirror. Though the servo unit is dependent on the control unit, and the control unit is dependent on the servo unit, there needs to be only the bowden wire connecting the two together, and the bowden wire may be as long as desired.

The device has been described as a mirror for the side of the truck opposite to the drive. It will easily be seen that the device has ready application to the driver-side also. Many of the same situations discussed relative to the right side will apply for the left side; e.g., turning corners, entering intersections, etc. For backing into loading docks, an adjustable mirror on both sides would be advantageous. There are numerous other applications for the mirror whether mounted on the right side or the left side of the truck. In either case, the feature of locking the mirror in other than its normal position will allow the driver to prevent the glare of lights behind him at night, or sunlight during the day.

It will of course be understood that the device here presented is by way of illustration only, and is meant to be in no way restrictive; therefore, numerous changes and modifications may be made, and the full use of equivalents resorted to without departing from the spirit or scope of the invention as outlined in the appended claim.

What is claimed as invention is:

A rear view mirror including a bracket, a stud on said mirror, a frame supported by said bracket, a mirror mounted in said frame, said mirror being pivotable about its vertical axis, a servo unit mounted on said frame, said servo unit including a housing, a spindle axially disposed within said housing, said spindle having a central bore to receive said stud, a pulley in said housing concentric with said spindle and fixed thereto, a spring within said housing and acting between said pulley and said housing to cause rotation of said pulley relative to said housing, adjustable stop means to limit the rotation of said pulley, and a cable wrapped around said pulley and passing through said housing; a control unit to control said servo unit, said control unit including a second housing, a rack gear reciprocable within said second housing, a pinion gear rotatably mounted in said second housing and meshing with said rack gear, a nipple on said second housing, a shaft rotatably received in a bore in said nipple, said pinion gear being mounted on said shaft, a spring surrounding said shaft between the wall of said second housing and said pinion gear, said spring acting to push said pinion gear away from said wall, a pin projecting from said wall within said second housing, said pinion gear having a plurality of holes, said holes being radially spaced so that any one of said holes can receive said pin, said cable being attached to said rack gear and passing through said housing, the arrangement being such that rotation of said pinion gear will move said rack gear and pull said cable, said cable will pull said pulley against the tension of the first mentioned spring to rotate said mirror.

References Cited by the Examiner

UNITED STATES PATENTS

| 1,169,898 | 2/1916 | Wilcox | 74—501 X |
| 1,856,069 | 5/1932 | Dina | 74—422 |
| 2,149,598 | 3/1939 | Girl et al. | 88—93 X |
| 2,422,320 | 6/1947 | Troemel | 74—501 X |
| 2,545,003 | 3/1951 | Miller | 74—501 |
| 2,607,581 | 8/1952 | Love et al. | 74—501 X |
| 2,696,142 | 12/1954 | Langford | 88—93 |
| 2,717,531 | 9/1955 | Schenck | 88—93 |
| 2,758,508 | 8/1956 | Petri et al. | 88—93 |
| 2,843,018 | 7/1958 | Cooper et al. | 88—98 |
| 2,856,817 | 10/1958 | Garden | 88—98 |
| 2,903,944 | 9/1959 | Cooper | 74—501 X |

FOREIGN PATENTS

| 62,123 | 12/1954 | France. |
| 265,061 | 5/1929 | Italy. |
| 450,982 | 8/1949 | Italy. |

BROUGHTON G. DURHAM, *Primary Examiner.*

MILTON KAUFMAN, *Examiner.*